MOVABLE MEANS COMPRISING VAPOR-PLATING NOZZLE AND EXHAUST

Filed Sept. 8, 1965

United States Patent Office 3,282,243
Patented Nov. 1, 1966

3,282,243

MOVABLE MEANS COMPRISING VAPOR-PLATING NOZZLE AND EXHAUST

Wilton Phillips, Jr., Baton Rouge, La., and Charles W. Watson, Jr., Wilmington, Del., assignors to Ethyl Corporation, New York, N.Y., a corporation of Virginia Filed Sept. 8, 1965, Ser. No. 492,965
(Filed under Rule 47(a) and 35 U.S.C. 116)
2 Claims. (Cl. 118—49)

This application is a continuation of our co-pending application Serial No. 106,399, and now abandoned.

This invention relates to the art of coating or plating metals upon substrates. In particular, the invention relates to the metal plating of substrates by deposition of metal from readily heat decomposable volatile metal containing compounds.

Various methods and apparatus for plating metals upon numerous substrates are known to the art most notable among which is that technique known as vapor phase metal plating. Pursuant to such methods for vapor plating metals, the substrate to be plated is placed within a chamber and the chamber purged to assure an inert atmosphere. The substrate to be metal plated is then heated to a temperature above the decomposition temperature of the metal containing compound, the metallic portion of wihch constitutes the metal which is to be plated upon the object. By then contacting the substrate to be metal plated with the volatilized metal containing compound, the compound is decomposed and the metallic portion of the compound is deposited upon the surface of the substrate. While these prior art methods for metal plating objects have been in general successful, the various methods and apparatus have been deficient in several respects.

An important and major deficiency of the prior art is their failure to provide a uniform adherent coating upon the substrate which is metal plated. Such methods provide metal coatings which are not sufficiently uniform and consequently an important and burdensome prior art step is necessary; namely, grinding, sanding or polishing the metal surface to a uniform thickness.

To overcome these and other deficiencies of the prior art it is therefore an object of the present invention to set forth an apparatus for providing more efficient and effective metal plating under conditions and features of operation not discovered by the workers of the prior art. In particular, it is an object to disclose herein an apparatus by which a uniform and adherent metal coating can be plated upon a substrate. Specifically, it is an object to provide an apparatus capable of metal plating substrates with purer metals in shorter time. It is also an object to provide an apparatus for plating metals on substrates so as to control the thickness of the coating, to provide a more adherent coating, and to provide a coating of crystalline form. Also, it is an object to provide a highly unique apparatus capable of carrying out these ends. These and other objects will be evident as the discussion proceeds.

The foregoing and other objects are achieved by the present invention which comprises bringing a substrate to be metal plated into contact with a volatilized stream of a heat decomposable metal containing compound under specified conditions, particularly under conditions including those wherein the volatilized stream is directed toward the surface of the substrate at an angle substantially parallel to that of the surface being plated up to an angle of inclination (angle from horizontal) of no greater than about 60 degrees, measured from the surface of the substrate being plated.

A preferred embodiment of the present invention comprises means for raising the temperature of the substrate above the decomposition temperature of a heat decomposable metal containing compound which is to be used as the source of the plating metal, heating and vaporizing the metal containing compound and then, under vacuum conditions, directing the flow of the vaporized metal containing compound upon the surface of the substrate from a direction that is substantially parallel to the surface of the object being plated while simultaneously removing the gases of decomposition which form as plating occurs. In this manner an adhesive and uniform metal coating is formed upon the substrate. Although the reasons why such outstanding advantages are obtained under conditions of substantially parallel flow are not fully understood, it is believed that substantially parallel flow prevents overheating and subsequent decomposition of the volatilized metal containing compound in the gas phase and permits the desirable decomposition of the compound at the surface of the substrate. In other words, it has been found that by providing substantially parallel flow of the volatilized metal containing compound across the surface of a substrate being plated while simultaneously removing the by-product gases of decomposition from the plating area unexpected beneficial results are obtained. These benefits are believed to result because the volatilized stream of the metal containing compound does not contact intimately the byproduct gases of the volatilized metal containing compound resulting from previous contact with the object being plated in a sufficient quantity or for a sufficient length of time to cause substantial decomposition of the volatilized metal containing compound in the gas phase. Rather, decomposition occurs almost entirely at the surface of the substrate.

While it has been found that the most ideal and best manner of plating a substrate is to provide susbtantially parallel flow, some departure from parallel flow is contemplated within the spirit and scope of this invention. Thus, the volatilized metal containing gas stream can be caused to flow across or directed upon the surface of the substrate being plated so that the angle of inclination of the stream with the surface of the substrate is up to 20 degrees from horizontal with good results though the uniformity of the metal coating is not quite as good as when the flow is substantially parallel. Angles of as high as about 60 degrees can also be employed with some success, but when angles considerably higher than about 60 degrees are employed, considerable decomposition of the volatilized metal containing plating compound occurs in the gas phase above the surface of the substrate being plated rather than at the surface of the substrate itself. This undesirable gas phase decomposition of the volatilized metal containing compound may produce a loose, less adherent coating than is desirable. Undesirable gas phase decomposition also generally creates poor results inasmuch as the metal coatings are non-uniform, discolored and highly porous.

Under circumstances wherein the flow of the metal containing volatilized gas is considerably reduced to avoid any substantial amount of decomposition of the volatilized metal containing compound in the gas phase, as opposed to decomposition of the compound at the plate, it is possible to employ angles of inclination somewhat greater than 60 degrees though under such circumstances the economy of the process may be drastically curtailed. Angles of inclination of between about 20 degrees and about 60 degrees may be used with a fair degree of success, and the metal deposited will be suitably adherent and of sufficient purity for many industrial requirements.

In all embodiments of the apparatus, the non-metallic portions or byproducts of heat decomposable metal containing compounds are removed from contact with the surface being plated as rapidly as possible. In other words, the gases resultant from the decomposed compound preferably are removed from the process substantially at the same rate that they are formed. The byproduct gases are best removed from a location downstream of the location wherein the volatilized metal containing heat decomposable compound is introduced. In the most preferred embodiment, removal of the byproduct gases is accomplished by removing the byproduct gases via a plurality of locations downstream of the location wherein the volatilized metal containing compound is introduced and particularly from a plurality of locations above and substantially parallel to the surface of the substrate being plated.

To provide for best results, the pressure within the plating zone is maintained under vacuum conditions. Preferably, the plating zone is maintained at a vacuum pressure of less than about 6 millimeters of mercury. Pressures can range even as high as atmospheric and metal plating of a substrate obtained. A preferred metal plate or coating, however, is that obtained under reduced pressure and particularly when the vacuum pressure is less than about 6 millimeters of mercury. Pressures below 6 millimeters of mercury are especially desirable when employing heat decomposable metal containing compounds which generate hydrogen as a byproduct of decomposition because above this pressure there exists the possibility of rapid oxidation of the hydrogen and possible hydrogen combustion should air enter the system and be present under certain conditions. Higher pressures can be employed with hydrogen compounds if a blanketing layer of an inert gas is used to dilute the hydrogen. Any vacuum pressure below 6 millimeters of mercury can be used successfully with any suitable metal containing compound. In accordance with a preferred method, the range of vacuum pressure is maintained at from about 0.4 millimeters of mercury to about 6 millimeters of mercury. Plating at this pressure permits considerable flexibility in obtaining adherent coatings having the desired thickness and uniformity. It also permits the formation of a nonporous crystalline coating of metal upon a substrate which permits a wide range of uses. Particularly excellent results have been obtained by providing a vacuum pressure of from about 2 millimeters of mercury to about 3 millimeters of mercury.

An apparatus embodiment of the present invention comprises enclosing walls providing an inner space defining a chamber, with the chamber being connected to means for subjecting the chamber to a vacuum pressure. The apparatus embodiment of the invention also includes heating means for heating the face of a substrate to be metal coated and means to maintain the substrate within the chamber in spaced relationship with vapor spray means, and pursuant to the most preferred form of the apparatus, also in spaced relationship with vapor exhaust means. In a preferred embodiment of the invention, the heating means takes the form of a heater plate upon the face of which is supported the substrate to be metal coated. The vapor exhaust means communicates between the chamber and the wall exterior and provides a vacuum pressure. In the most preferred embodiment the chamber is provided with a plurality of terminal openings disposed within the chamber so that these openings are aligned above and in substantial spaced parallelism to the face of the heater plate. In the most preferred embodiment, the vapor spray means is located within the chamber on a plane substantially common to the plane upon which the terminal openings of the vapor exhaust means are located. The vapor spray means is provided with a plurality of jet openings into the chamber in a direction diametrically opposed to the direction of the terminal openings of the vapor exhaust means and substantially parallel to and above the face of the heater plate. Preferably, for reasons of economy, the distance between the openings of the vapor exhaust means and the jet openings of the vapor spray means is not less than the throw distance of the volatilized plating compound nor greater than about three times the throw distance, the throw distance is defined as the maximum distance between the jet openings of the vapor spray means and a point on the substrate at the moment it is actually being plated. The distance between the parallel planes formed by the face of the heater plate and the openings of the vapor exhaust means and jet openings of the spray nozzle is determined by the thickness of the substrate to be plated and by the vapor velocity so that there is provided sufficient clearance for the substrate between these parallel planes and a vertical distance between the face of the heater plate and the openings of the spray nozzle no greater than would produce an angle of inclination greater than about 60 degrees measured from the nozzle to the area of the substrate being plated.

By means of the described relationship between the vapor spray means and the upper face of the heater plate, including preferably also the relationship between these latter elements and the vapor exhaust means, a stream of vaporized metal containing compound, or compounds, under proper conditions may be introduced into the chamber through the vapor spray means in the direction of the vapor exhaust means and most preferably, substantially parallel to the upper face of the heater plate. Thus, by placing a substrate upon the upper face of the heater plate, by producing vacuum conditions, by bringing the surface of the substrate to be plated to a temperature above the decomposition temperature of the metal containing compound, a metal coating of high and unusual quality is formed upon the substrate by directing a volatilized stream of the metal containing compound upon the surface of the substrate substantially parallel to the surface of the substrate and over substantially its entire surface. Pursuant to these method steps, the volatilized metal containing compound is decomposed by contacting the substrate and the metal contained therein deposited upon the substrate. Simultaneously, the non-metallic portion of the decomposed metal containing compound is withdrawn through a plurality of terminal openings disposed above and in substantial spaced parallelism to the face of the heater plate supporting the substrate.

The invention will be more readily understood from a description of the process with reference to a preferred apparatus and to specific examples.

Figures 1, 2:
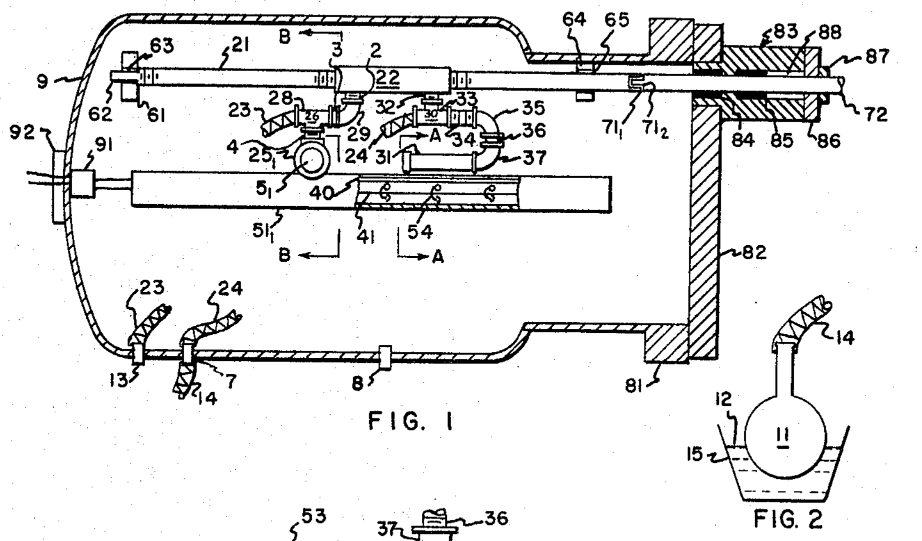
FIGURE 1 is a side elevation view or vertical sectional view showing a preferred embodiment of the apparatus of this invention.
FIGURE 2 shows a schematic diagram of a suitable container and heating apparatus for providing a volatilized metal containing compound to the chamber.

Referring to the drawings in detail, FIGURE 1 shows in section essentially the total apparatus embodiment, specially certain essential elements and their relationship to each other. The apparatus shown includes exhaust manifold assembly 26 (perforated members of manifold $\mathbf{26_1}$, $\mathbf{26_2}$ shielded from view behind the roller wheel $\mathbf{25_1}$), and spray nozzle assembly 30 having nozzle device 31. These elements are located in axially movable, though parallel, relationship with heater plate 41 upon which is placed substrate 40, and are contained within a chamber defined by the enclosing walls 9 which are capped by flange 81 having a removable or hinged cover 82. Outlet port 8 which communicates the chamber to the wall exterior is provided and is adaptable for connection with means for subjecting the chamber to vacuum pressure. Outlet port 8 may be used when it is desired to produce the desired vacuum as rapidly as possible as, for example, at startup. It will be understood that exhaust manifold assembly 26 alone is capable of producing the desired vacuum particularly during normal operation.

Figure 5:
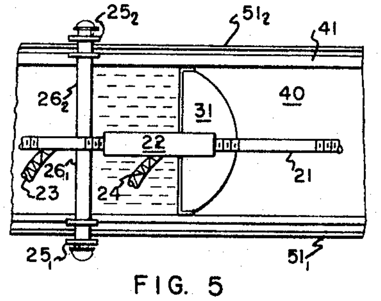
FIGURE 5 is a plan view showing in particular the interrelation of the movable nozzle, exhaust manifold and heater plate and their relationship to a substrate placed upon the surface of the heater plate.
Figure 7:
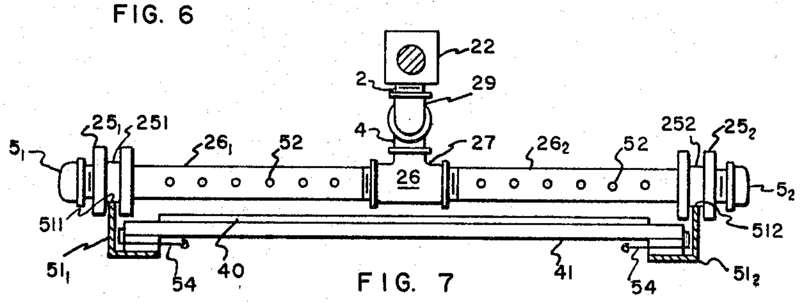
FIGURE 7 is a vertical sectional view of the exhaust manifold taken substantially on the line BB of FIGURE 1, viewed in the direction of the arrows, and showing the relation of the exhaust manifold, the heater plate and their relationship to the substrate.

Within the chamber are located heater plate 41, spray nozzle device 31, and exhaust manifold 26 (perforated members shielded by the roller wheels 25 in FIGURE 1 but clearly shown in FIGURES 5 and 7). These are located in parallel relationship with each other with heater plate 41 on one plane and spray nozzle device 31 and exhaust manifold 26 on another plane. Terminal openings 52 of exhaust manifold assembly 26 (FIGURE 7), and openings 53 of spray nozzle device 31 (FIGURE 3), are rigidly fixed in parallel relation one to the other on a common plane. Thus, openings 53 at nozzle 31 and openings 52 of exhaust manifold assembly 26 face each other and are located on a common plane which is substantially parallel to and above the upper surface or upper face of heater plate 41, and consequently substantially parallel to substrate 40 supported upon the face of heater plate 41.

While spray nozzle 31 and members $26_1$, $26_2$ of exhaust manifold assembly 26 are rigidly maintained in relationship one with the other and in a plane parallel with the upper surface of the heater plate 41, these members are nevertheless adapted for traversing in unison substantially the entire length of heater plate 41. Thus, spray nozzle 31 and exhaust manifold assembly 26 are maintained in fixed relationship to each other and to the upper surface of heater plate 41 by rigid interconnection to axially movable carrier device 22 which is threadably connected to threaded shaft 21 and axially movable thereupon. Axial movement of carrier device 22 upon shaft 21 thus carries with it exhaust manifold assembly 26 and spray nozzle assembly 30 while maintaining the above defined parallelism of these members with the upper surface of heater plate 41. Because shaft 21 is also substantially parallel to the surface of heater plate 41 throughout its length, the defined parallel relationship of the assemblies 30, 26 and 41 will be maintained.

Considering these details further, threaded shaft 21 is rotatably connected at one end 62 to member 61 which is journaled to walls 9 by means not shown. End 62 of threaded shaft 21 is of reduced diameter and is inserted within opening 63 within member 61 so that whole shaft 21 is rotatable within member 61. At the other end of the chamber, threaded shaft 21 is supported upon support bearing 64, with shaft 21 being passed through and rotationably movable within opening 65. Shaft 21 is keyed to rotatable shaft 72 by tongue and groove arrangement $71_1$, $71_2$. Axial movement of carrier device 22 is thus produced by rotation of shaft 72 and corresponding rotation of shaft 21. Shaft 72 is extended to the exterior of the chamber through openings within flange 81 and cover 82. Horizontal, though rotational, support of shaft 72 at one end is also provided and maintained through use of packing gland housing 83 having opening 88 therethrough. Within opening 88 of this device, a seal is provided by means of packings 84, 85. These packings 84, 85 are held in place by means of packing gland cover 86 which is bolted in place by means of lock nut 87. Rotation of shaft 72 can be performed by any convenient motor means (not shown) or by hand. As stated, rotation of threaded shaft 21 and axial movement of the carrier device 22 by rotation of the shaft 72 produces movement in unison of spray nozzle assembly 30 and exhaust manifold assembly 26 which, as stated, are located and maintained on a plane substantially parallel with and above the upper surface of the heater plate 41.

Exhaust manifold assembly 26 (detailed in FIGURE 7) is rigidly connected to movable carrier device 22 through suitable connections, viz., nipples 2, 3, 4, elbow 29 and T's 27, 28. Extending from each side of T 27 are perforated members $26_1$, $26_2$ forming an essential portion of exhaust manifold assembly 26. On each end of perforated members $26_1$, $26_2$, rollers $25_1$, $25_2$ are held in place by screw caps $5_1$, $5_2$. The rollers $25_1$, $25_2$ permit rolling movement of the rollers $25_1$, $25_2$ upon the upper edges 511, 512 of angle irons $51_1$, $51_2$ which act as runways for movement of exhaust assembly 26 as it traverses the length of heater plate 41 by rolling movement of surfaces 251, 252 upon the edges 511, 512 of angle irons $51_1$, $51_2$. The relationship between exhaust manifold assembly 26, heater plate 41 and substrate 40, maintained upon the upper surface of the heater plate 41, is also clearly shown in FIGURE 7 which is the section BB of FIGURE 1 viewed in the direction of the arrows. Flexible tubing 23 (shown broken) is connected to T 28, permitting free movement of exhaust manifold assembly 26 throughout the length of the chamber while providing exhaust to the chamber exterior through vapor exhaust port 13.

Spray nozzle device 31 is rigidly connected to movable carriage 22 on a plane with the exhaust manifold members $26_1$, $26_2$ and parallel to the upper surface of heater plate 41 by means of elbows 35, 37 and nipples 34, 36 which are connected to T 33 which is in turn affixed to movable carriage 22 by means of nipple 32. It is obvious that by suitable selection of a fitting, or fittings, jet openings 53 of the spray nozzle device 31 can be tipped downward so that spray emitted from the openings will be directed toward the surface of heater plate 41 at any desirable angle of inclination up to about 60 degrees from the horizontal plane of the heater plate. Flexible tubing 24 attached to the end of T 33 permits passage or conveyance of vaporized metal containing compound for the plating operation from outside the chamber by means of port 7, flexible conduit 24, and openings 53 of spray nozzle device 31.

A highly useful and preferred method of introducing the vaporized metal containing compound into the chamber through nozzle spray device 31 is shown in FIGURE 2. A metal containing heat decomposable compound is provided within container 11. This container 11 is operatively connected to spray device 31 through flexible conduit 14 to port 7 which in turn is connected through flexible tubing 24 to spray nozzle device 31. By heating container 11, volatilized compound is provided to the spray nozzle device 31. A suitable method of heating container 11 is to immerse container 11 within hot oil bath 12 contained within pot 15.

Figure 3:
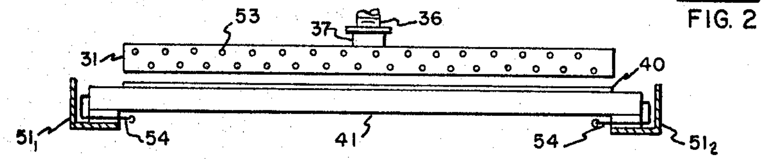
FIGURE 3 is a vertical sectional view of the apparatus taken substantially on the line AA of FIGURE 1, viewed in the direction of the arrows.

FIGURE 3 (section AA of FIGURE 1) shows in detail the relationship existing between nozzle openings 53 of spray nozzle device 31, heater plate 41 resting upon angle irons $51_1$, $51_2$, and between substrate 40 which rests upon the upper surface of the heater plate 41.

Figure 6:
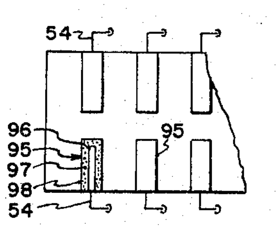
FIGURE 6 is a plan sectional view of the heater plate showing the disposition of cartridge type heater elements therein.

A highly desirable feature of the preferred apparatus is that there is provided a generally uniform method of heating heater plate 41. This is accomplished quite conveniently by use of a plurality of cartridge heaters or tubular heating elements 95 uniformly disposed within and on either or both sides of heater plate 41 as shown in FIGURE 6. These cartridge heaters or tubular elements 95 are preferably of a type containing resistance wire 96 embedded in powdered insulating material 97 disposed within tubular sheath 98. These tubular electrical heater elements 95 are connected through suitable electrical conduits 54 which are brought together to make electrical connection at box 91 (FIGURE 1) and then passed through terminal block 92 on the outer wall of the chamber to an electrical source of power supply.

Figure 4:
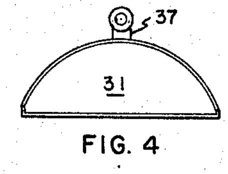
FIGURE 4 is a plan view of the movable spray nozzle shown at different angles in FIGURES 1 and 3 above.

In FIGURE 5 there is shown in plan view the disposition and relationship of the more critical elements contained within the chamber. Thus, there is shown spray device 31 with vaporized metal containing compound (broken lines) being emitted from openings 53. Downstream of nozzle device 31 is shown exhaust manifold assembly 26 which conducts the byproduct vapors of decomposition to the chamber exterior via conduit 23 and exhaust port 13. Spray nozzle device 31 (plan view thereof in FIGURE 4) is movable axially throughout substantially the entire length of heater plate 41 upon which is supported substrate 40. The spray nozzle device is preferably at least about three-quarters of the width of the surface being plated. Simultaneously movable at all times with spray nozzle device 31 is exhaust manifold assembly 26 which, as stated heretofore, receives and removes the products of decomposition of the metal containing compound and conveys these products through conduit 23 via port 13 to the outside of the chamber. Exhaust manifold assembly 26 (FIGURE 7) is partially supported by movable carrier device 22 and partially by roller wheels $25_1$, $25_2$ having recessed portions or grooves 251, 252 which are in contact with and roll upon the mating edges 511, 512 of angle irons $51_1$, $51_2$.

The following examples are illustrative of the present invention, but are in no sense intended as limiting.

*Example I*

For each of four runs, a clean thin planar 1 foot x 2 foot type 316 stainless steel sheet was placed upon the heater plate within the chamber of the vapor plating device described by reference to the figures. The temperature of the substrate was raised to a temperature range shown in Table I, and the chamber was then sealed. The pressure within the chamber was reduced to 0.14 millimeter of mercury, and the mols of plating compound shown in Table I were then placed within a container outside the chamber but operatively connected to the spray nozzle device within the chamber. This metal containing plating compound, at the reduced pressure of the chamber, was then heated and volatilized by immersion of the container within a hot oil bath at 60° C. Within a few moments, volatilized compound was emitted from the vapor spray nozzle in a direction substantially parallel to the upper face of the type 316 stainless steel plate substrate. Upon contact of the vapors with the plate, a thin crystalline coating began to form thereupon. By transversing the spray nozzle back and forth at a rate of approximately one foot per minute over the entire length of the substrate, the whole surface of the substrate was coated with a very adherent substantially uniform coating of pure metal in highly crystalline form.

After completing the cycles traversed, as shown in Table I, the chamber was opened and the substrate removed from the chamber. It was found that a highly uniform, highly non-porous, very crystalline metal coating of about one mil thickness had been formed upon the steel plate. Tests also showed that the fast adherence of the coating upon the plate was outstanding.

Table I below illustrates the conditions for four runs made under similar conditions varying from the preceding description only in regard to the conditions tabulated. In particular, the runs were all made under conditions wherein the vaporized plating compound was directed at an angle substantially parallel with the face of the stainless steel plate substrate being plated.

TABLE I

| Run | Temp. of Substrate Being Plated, ° C. | Average Temp. of Substrate Being Plated, ° C. | Mols of Plating Compound Used | Cycles Traversed by Spray Nozzle | Operating Vacuum, mm. of Hg | Time Required for Run (Min.) |
|---|---|---|---|---|---|---|
| 1 | 159–175 | 170 | 0.72 | 4 | 2.4–2.8 | 18 |
| 2 | 176–188 | 180 | 0.52 | 2½ | 2.4–2.5 | 15 |
| 3 | 178–190 | 180 | 0.51 | 3 | 2.3–2.6 | 15 |
| 4 | 192–198 | 195 | 0.9 | 5 | 3.7 | 20 |

After each of the foregoing runs, the stainless steel plate was tested. In each instance it was found that a highly uniform, highly nonporous, very adherent crystalline metal coating had been formed upon the stainless steel plate.

*Example II*

Example I was repeated in all details except that a similar sized sheet of a different material was substituted for the stainless steel plate substrate described in Example I. Again highly significant results were achieved. The following materials were substituted for the stainless steel plate described in Example I: iron, copper, zinc, nickel, aluminum and several varieties of earthenware, ceramic and vitreous materials. In all cases a highly uniform adherent crystalline metal coating was formed upon the substrate as in Example I.

*Example III*

Each of the foregoing examples were repeated in all details except that the angle of inclination at which the vaporized metal containing compound was directed upon the surface being plated was changed to 20 degrees. Again a highly adherent crystalline metal coating was formed upon the substrate. The uniformity of the coating was fairly good but not as effective as that obtained in the foregoing examples.

*Example IV*

Example I was repeated in all details except that an angle of inclination of 45 degrees was employed, the operating temperature was maintained at 200° C. and the operating pressure at 2.5 millimeters of mercury, and 0.37 mol of metal plating compound was vaporized and fed into the chamber. After 7 traversals (3½ cycles) of the stainless steel sheet with the spray nozzle, and after an interval of about 15 minutes, a metal coating of approximately ½ mil thickness was formed upon the steel plate. The crystalline metal plating was found to be suitably adherent and reasonably nonporous.

*Example V*

When Example IV was repeated in all details except that the angle at which the vaporized compound strikes the surface of the object was changed to 60 degrees. An adherent, though somewhat discolored and non-uniform coating, was formed upon the substrate. When tests were performed upon the substrates, it was found that the metal plating is suitably adherent and sufficiently nonporous for some industrial applications.

*Example VI*

By repeating Example I, employing various plating compounds under different conditions of temperature and pressure, many different metals were plated upon a variety of substrates. Plating conditions for eight runs wherein various metals were plated upon many substrates are those shown in the Table II below. In each instance, the substrate named was uniformly coated with a metal plate of significantly quality.

TABLE II

| Run | Plating Compound | Plating Metal | Temp. (° C.) of Plating Compound | Pressure of Chamber (mm. Hg) | Kind of Substrate | Temp. (° C.) of Substrate |
|---|---|---|---|---|---|---|
| 1 | Chromium carbonyl | Chromium | 90 | 0.4 | Steel | 230 |
| 2 | Molybdenum carbonyl | Molybdenum | 90 | 0.4 | Aluminum | 190 |
| 3 | Tungsten carbonyl | Tungsten | 90 | 0.4 | Copper | 200 |
| 4 | Dibenzene chromium | Chromium | 50 | 0.1 | Steel | 400 |
| 5 | do | do | 50 | 0.1 | Pyrex glass | 200 |
| 6 | Copper nitrosyl | Copper | 70 | 0.1 | Steel | 310 |
| 7 | Mesitylene chromium tricarbonyl | Chromium | 140 | 1.0 | do | 220 |
| 8 | Aluminum triethyl | Aluminum | 75 | 0.1 | Copper | 400 |

In general, it is desirable to maintain the temperature of the surface of the substrate to be plated at about 20° C. to about 80° C., and higher, above the decomposition temperature of the metal containing compound which is to furnish the plating metal, provided that decomposition of the hydrocarbon by-product gases does not occur. This temperature in most instances provides sufficiently rapid and complete decomposition of most metal containing compounds.

Substrates of many shapes may be plated without departing from the spirit and scope of the invention, but it is preferable to plate only planar shaped substrates. In general, it is preferable to metal plate substrates whose exposed surfaces are substantially parallel to the direction of flow of the plating compound rather than to metal plate substrates having a plurality of surfaces which are necessarily simultaneously exposed to the plating vapors and which surfaces may provide various angular surfaces of exposure to the vapors so that the contacting therewith is made at angles of inclination substantially outside those angles described previously. While it is preferable to plate substrates having large exposed surfaces rather than to plate substrates providing very small areas, for reasons of economy and other reasons, it is preferred to plate substrates having an exposed surface area to be plated greater than about four square inches. Substrates of preferred size for plating are those providing an exposed surface area of from about one square foot to about two hundred square feet although even larger surfaces can be plated successfully.

Nonlimiting and illustrative of the metal containing compounds which can be used pursuant to the practice of this invention are such carbonyls as molybdenum carbonyl, tungsten carbonyl, cobalt carbonyl, nickel carbonyl, iron pentacarbonyl, chromium carbonyl and the like; nitrosyls such as cobalt nitrosyl carbonyl and the like; nitroxyls such as copper nitroxyl and the like; metallic hydrides such as dibromoaluminum hydride, chloroaluminum dihydride, diethylaluminum hydride and the like; halides such as chromyl chloride, aluminum chloride, diethylaluminum bromide, and the like; and hydrocarbon metallic compounds such as aluminum triisobutyl, aluminum tripropyl, and the like.

Substrates metal plated according to the present invention are suitable for a wide variety of purposes. For example, metals or materials which may corrode can be plated with non-corrosive metals. The resulting coated materials are then suitable for applications wherein otherwise they may not have been employed because of their corrosive properties. Specifically, for example, a steel sheet can be provided with an adherent, uniform coating of aluminum. The steel object is then adaptable for use in corrosive environments.

Having described the invention, what is claimed is:

1. In a metal vapor plating apparatus having a plating chamber adapted to enclose and support a substrate to be plated and having means for heating said substrate to a temperature sufficient to decompose heat-decomposable metal plating vapors, the improvement comprising spray nozzle means mounted within said chamber for movement over the surface of the substrate and positioned to direct a stream of the metal plating vapors onto the heated substrate at an angle from substantially parallel to 20° inclination with respect to the path of travel and vapor exhaust means movable simultaneously with said spray nozzle means over the substrate surface so that the distance between said vapor spray nozzle means and said vapor exhaust means is maintained constant whereby the byproducts of decomposition are removed and the substrate surface is uniformly plated with the metal decomposed from the metal plating vapors.

2. In a metal vapor plating apparatus having a plating chamber adapted to enclose and support a substrate to be plated and having means for heating said substrate to a temperature sufficient to decompose the vapors of an amine complex of aluminum hydride, the improvement comprising spray nozzle means mounted within said chamber for movement over the surface of the substrate and positioned to direct a stream of the vaporous amine complex of aluminum hydride onto the heated substrate at an angle from substantially parallel to 20° inclination with respect to the path of travel and vapor exhaust means movable simultaneously with said spray nozzle means over the substrate surface whereby the distance between said vapor spray nozzle means and said vapor exhaust means is maintained constant whereby the byproducts of decomposition are removed and the substrate surface is uniformly plated with an adherent aluminum coating of high purity.

References Cited by the Examiner

UNITED STATES PATENTS

| | | | |
|---|---|---|---|
| 2,344,138 | 3/1944 | Drummond | 117—107 |
| 2,508,509 | 5/1950 | Germer et al. | 117—107 X |
| 2,631,948 | 3/1953 | Belitz et al. | 117—107 X |
| 2,698,812 | 1/1955 | Schladitz | 117—107 |
| 2,700,365 | 1/1955 | Pawlyk | 117—107 |
| 2,783,164 | 2/1957 | Hill | 117—107 |
| 2,791,515 | 5/1957 | Nack | 117—107.1 |
| 2,824,828 | 2/1958 | Homer et al. | 117—107.2 |
| 2,897,098 | 7/1959 | Homer et al. | 117—107 |
| 2,929,739 | 3/1960 | Breining et al. | 117—107 |
| 2,994,297 | 8/1961 | Toulmin | 117—107 X |

FOREIGN PATENTS 492,464 3/1954 Italy.

OTHER REFERENCES

Wilberg et al.: "Zeitschrift fur Anorganische und Allgemeine Chemie," vol. 272, 1953, pp. 221–232.

MORRIS KAPLAN, *Primary Examiner.*